(12) United States Patent
Klinkhardt et al.

(10) Patent No.: US 12,387,379 B1
(45) Date of Patent: Aug. 12, 2025

(54) CAMERA AND DISPLAY CALIBRATION

(71) Applicant: Apple Inc., Cupertino, CA (US)

(72) Inventors: Marvin Klinkhardt, Berlin (DE); Uma Arunachalam, San Jose, CA (US); Tom Sengelaub, Oakland, CA (US); Hua Gao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 143 days.

(21) Appl. No.: 18/470,347

(22) Filed: Sep. 19, 2023

Related U.S. Application Data

(60) Provisional application No. 63/376,765, filed on Sep. 22, 2022.

(51) Int. Cl.
*G06T 7/80* (2017.01)
*G06T 7/70* (2017.01)
*H04N 23/11* (2023.01)

(52) U.S. Cl.
CPC .......... *G06T 7/85* (2017.01); *G06T 7/70* (2017.01); *H04N 23/11* (2023.01); *G06T 2207/10012* (2013.01)

(58) Field of Classification Search
CPC ... G06T 7/85; G06T 7/70; G06T 2207/10012; H04N 23/11
See application file for complete search history.

(56) References Cited

U.S. PATENT DOCUMENTS

| | | | | |
|---|---|---|---|---|
| 10,620,432 | B1 * | 4/2020 | Wheelwright | G02B 27/0172 |
| 2012/0287223 | A1 * | 11/2012 | Zhang | H04N 7/144 |
| | | | | 348/E7.083 |
| 2016/0320837 | A1 * | 11/2016 | Swedish | G06V 40/19 |
| 2018/0288403 | A1 * | 10/2018 | Cole | H04N 13/344 |
| 2020/0134927 | A1 * | 4/2020 | Huang | G02B 30/22 |
| 2021/0407174 | A1 * | 12/2021 | Walker | G06T 15/06 |
| 2022/0385877 | A1 * | 12/2022 | Kimata | H04N 23/632 |
| 2023/0360571 | A1 * | 11/2023 | Dang | G09G 3/025 |
| 2024/0179292 | A1 * | 5/2024 | Sun | H04N 13/398 |

* cited by examiner

*Primary Examiner* — Hung H Lam
(74) *Attorney, Agent, or Firm* — Robert C. Kowert; Kowert, Hood, Munyon, Rankin & Goetzel, P.C.

(57) ABSTRACT

Head-mounted devices (HMDs) include display screens for display of video and/or images. A complex lens is positioned between the display screen and a user's eye to render images shown on the display screen for correct appearance to the user's eye. Changes in relative position or orientation between the display and the lens may cause unwanted changes in the appearance of the images viewed by the user. A process is disclosed to determine changes in relative positions and orientation of the display screen and lens. By determining changes in relative positions and orientation, recalibration of the system may be implemented to continually present images to the user's eye with the proper focus for a more satisfactory user experience.

20 Claims, 5 Drawing Sheets

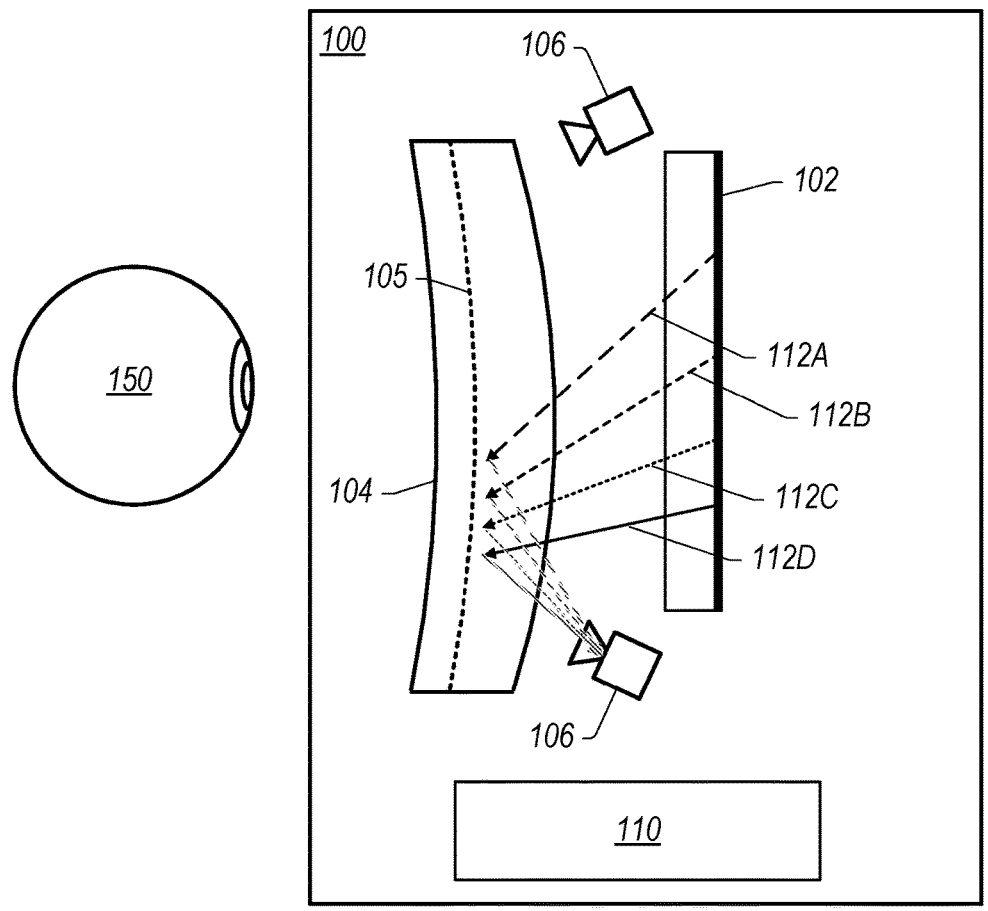
FIG. 1
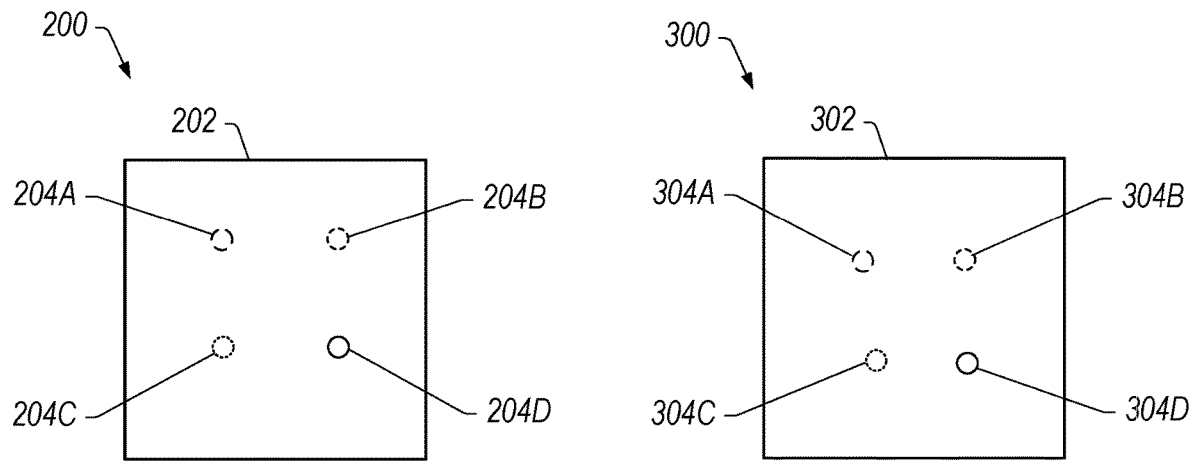
FIG. 2
FIG. 3

CAMERA AND DISPLAY CALIBRATION

PRIORITY CLAIM

The present application claims priority to U.S. Provisional App. No. 63/376,765, entitled "Camera and Display Calibration," filed Sep. 22, 2022, the disclosure of which is incorporated by reference herein in its entirety.

BACKGROUND

Technical Field

Embodiments described herein relate to camera and display systems for extended reality. More particularly, embodiments described herein relate to calibration methods for displaying of images.

Description of the Current Art

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

BRIEF DESCRIPTION OF THE DRAWINGS

FIG. 1 illustrates an example device in which various embodiments described herein may be implemented.

FIG. 2 depicts an example of an image with a known pattern that can be displayed on a display screen, according to some embodiments.

FIG. 3 depicts an example of a reflected image of the image with the known pattern of FIG. 2 captured by a camera, according to some embodiments.

Figure 4:
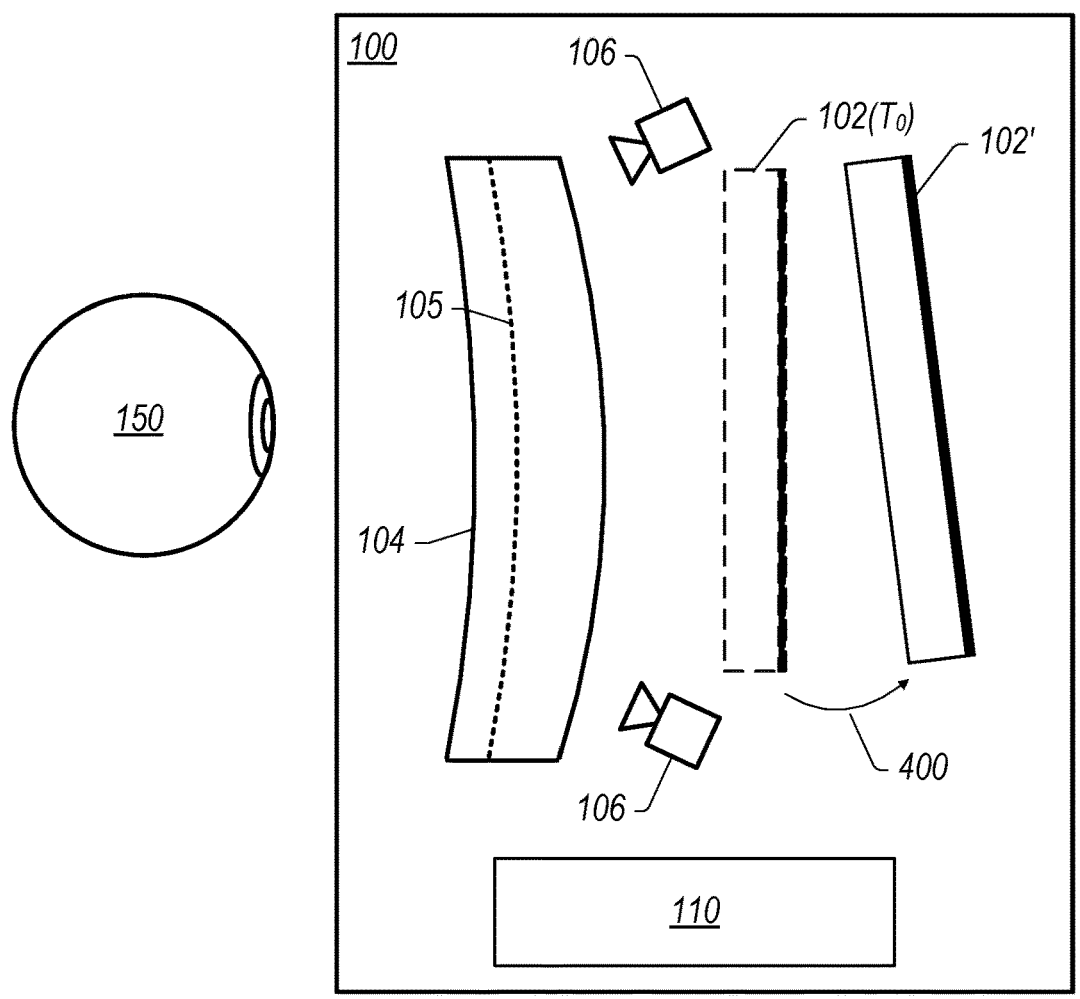
FIG. 4 illustrates a representation of device after a shift in component positions has occurred, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

In many XR (extended reality) head-mounted devices (HMDs), a complex lens is positioned between the user's eye and a display screen that presents images for viewing by the user. Examples of head-mounted devices (HMDs) that may implement a complex lens include, but are not limited to, headsets, helmets, goggles, or glasses worn by a user. The lens is implemented to adjust the images on the display screen as viewed by the user's eye such that the user views the images correctly (e.g., the user views the virtual image at being at a large distance from the user's eye). The lens adjusts the view of the images by bending light (e.g., distorting light) in certain ways according to the properties of the lens. Additionally, the display screen displays the images in a way calibrated to the properties of the lens (e.g., intrinsic properties of the lens) and properties between the lens and the display screen (e.g., extrinsic properties such as relative position and orientations of the lens and the display screen).

Ideally, the position and orientation of the lens relative to the display in the system is fixed and never changes over time. With the position and orientation of the lens and display fixed, calibrations made of the initial setup of the system (e.g., in the factory) will remain accurate over the life of the system. In reality, however, the system is subject to environmental factors that may affect the relative positions of the display screen and the lens. For example, changes in heat and humidity may change the relative positions of the display screen and the lens due to effects on the materials in the lens and the display screen as well as materials in mounting components for the lens and the display screen. Additionally, accidental events such as dropping the XR system or any other physically impactful event can potentially change the relative positions of the display screen and the lens.

The present disclosure contemplates methods for recalibrating the XR system in response to changes in the relative positions of the display screen and the lens. Many XR systems include cameras that are utilized for eye tracking (e.g., eye gaze tracking). These cameras typically operate in the infrared wavelength range and outside the visible wavelength range while the display screen presents images in the visible wavelength range. It has been found, however, that the visible image presented on the display screen has some components of infrared wavelength light. Additionally, the infrared wavelength light has been found to have some reflections off the lens that can be detected by the eye tracking cameras. Additional embodiments may also be contemplated where infrared images are display on the display screen and reflections from such images are implemented in the calibration and recalibration processes described herein.

Accordingly, the present disclosure contemplates assessing the infrared light reflected off the lens in images captured by the eye tracking cameras to determine changes in the relative positions of the display screen and the lens (e.g., changes in the extrinsic properties of the display screen and the lens). The intrinsic and extrinsic properties of the lens and the display screen may be determined at an initial stage of the system (e.g., in the factory before shipment of the system). The intrinsic properties may be determined by various measurements on the individual components of the system (such as the lens) while the extrinsic properties can be determined based on observations made during operation of the system. For example, images captured by the eye tracking cameras can be analyzed to determine the extrinsic properties between the display screen, the lens, and the cameras. From these properties, a calibrated model of the system can be determined. The system model may model the propagation of light through the system. For instance, the model may model the propagation of light from the display screen through the lens and to the user's eye as well as the propagation of light reflecting off the lens to the eye tracking cameras.

During use of the system, the model may be implemented to determine how images (e.g., visible images or infrared images) displayed on the display screen will be perceived by the user's eye through the lens. Thus, the system may use the model as a calibration tool for the presentation of images on the display screen such that when light from the display screen propagates through the lens (and the spaces between the display screen and the user's eye) and reaches the user's eye, the user's eye views the image with the intended (e.g., correct) appearance. Additionally, the model may be used to make a prediction of what images of reflections of the image captured by the eye tracking camera will look like (e.g., determine expected positions of pixels and objects in the captured images).

For recalibration of the model, an image (e.g., a visible image) on the display screen may be presented with a known pattern of pixels and objects. Because the pattern is known, the model may be used to determine the expected positions of the pixels and objects in images of reflected light captured by the eye tracking cameras. The cameras may then be used to capture actual images of the reflected pattern from which the actual positions of the pixels and objects in the reflections can be determined. The positions of the pixels or objects in the captured reflections can then be compared to the expected positions of the pixels or objects to determine differences between the actual positions and the expected positions. From these differences (if any), the model can be recalibrated and implemented in future presentations of images on the display screen. As described herein, recalibration of the model corrects for changes in the relative positions of the display screen and the lens to provide images that have a better (e.g., more correct) appearance to the user, thus improving comfort and experience of the user of the XR system.

FIG. 1 illustrates an example device in which various embodiments described herein may be implemented. Device 100 may be, for example, a head-mounted device (HMD) mounted on a user's head or otherwise positioned to be in front of the user's eye 150. As shown in FIG. 1, the device 100 may include display screen 102 with lens 104 positioned between the display screen and the user's eye 150. In certain embodiments, device 100 is part of an XR (extended reality) system where the device is a headset, helmet, goggles, or glasses. Display screen 102 may implement any of various types of display technologies. For example, display screen 102 may be a transparent or translucent display (e.g., eyeglass lenses) through which the user may view the real environment and a medium integrated with display screen 102 through which light representative of virtual images is directed to the wearer's eyes (e.g., eye 150) through lens 104 to provide an augmented view of reality to the wearer.

In various embodiments, device 100 implements one or more cameras (not shown) that may capture images of the user's environment. The cameras may be RGB cameras, infrared (IR) cameras, or other types of cameras or imaging systems. The images captured by the cameras may be processed by algorithms implemented in controller 110. For instance, controller 110 may implement algorithms using any combination of software and hardware (e.g., processors (system on a chip (SOC), CPUs, image signal processors (ISPs), graphics processing units (GPUs), encoder/decoders (codecs), etc.), memory, etc.) to generate and render video and/or images that include virtual content that are displayed on display screen 102 for viewing by the user. In some embodiments, controller 110 may be implemented on the device 100. Other embodiments may be contemplated where controller 110 is implemented on a base station that communicates with the device 100 via wired and/or wireless connections or on a combination of the device 100 and a base station.

In various embodiments, controller 110 is configured to implement functionality of the XR system and to generate frames (each frame including a left and right image) that are provided to display screen 102. In some embodiments, device 100 may also include memory (not shown) configured to store software of the XR system that is executable by the controller 110, as well as data that may be used by the XR system when executing on the controller. In some embodiments, the memory may also be used to store video captured by the cameras. In some embodiments, device 100 may also include one or more interfaces (e.g., a Bluetooth technology interface, USB interface, etc.) configured to communicate with an external device (not shown) via a wired or wireless connection. In some embodiments, at least a part of the functionality described for the controller 110 may be implemented by the external device. The external device may be or may include any type of computing system or computing device, such as a desktop computer, notebook or laptop computer, pad or tablet device, smartphone, handheld computing device, game controller, game system, and so on.

The memory in device 100 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used to store processed data, such as Flash or other "hard drive" technologies.

In some embodiments, device 100 may include one or more sensors (not shown) that collect information about the user's environment (video, depth information, lighting information, etc.). The sensors may provide the information to controller 110 of the XR system. In some embodiments, the sensors may include, but are not limited to, at least one visible light camera (e.g., an RGB video camera), ambient light sensors, and at least on eye tracking camera. In some embodiments, device 100 may be configured to render and display frames to provide an augmented or mixed reality (MR) view for the user based at least in part according to sensor inputs, including input from the eye tracking camera. The MR view may include renderings of the user's environment, including renderings of real objects in the user's environment, based on video captured by one or more video cameras that capture high-quality, high-resolution video of the user's environment for display. The MR view may also include virtual content (e.g., virtual objects, virtual tags for real objects, avatars of the user, etc.) generated by the XR system and composited with the displayed view of the user's real environment.

In certain embodiments, cameras 106 are configured to capture images of the user's eye 150 for implementation in an eye tracking (e.g., eye gaze tracking) process. For instance, cameras 106 may be infrared (IR) cameras) positioned on one side or at each side of the user's face. An illumination source (e.g., point light sources such as an array or ring of light-emitting diodes (LEDs)) that emits light towards the user's eye 150 or periorbital region)(not shown) may illuminate the user's eye or periorbital region for images being captured by cameras 106. In certain embodiments, the illumination source emits light and images are captured in the IR or near-IR range (e.g., wavelengths between about 740 nm and about 950 nm).

In various embodiments, cameras 106 are positioned on a same side of lens 104 as display screen 102, as shown in FIG. 1. Accordingly, cameras 106 may image user's eye 150 through lens 104. Cameras 106 may be pointed towards eye 150 to receive light from the illumination source reflected from the eye 150. In certain embodiments, controller 110 may send control signals to the illumination source and camera(s) 106 to control the illumination of the eye 150 and to capture images of the eye. The controller 110 may use the images of the user's eye 150 captured by the eye camera(s) 106 during an enrollment process to construct or adjust a 3D model of the eye 150. The eye model may then be used for one or more purposes. For example, the controller 110 may implement gaze tracking algorithms that estimate the user's gaze direction based on additional images captured by the camera(s) 106 and the eye model generated during the enrollment process. A gaze tracking algorithm may, for example, process images captured by the cameras 106 to identify glints (reflections of light from the illumination source) obtained from the eye cameras 106, pupil position and diameter, or other features of the eyes, and apply this information to the eye model to determine and track the direction in which the user is currently looking (e.g., the gaze direction).

In various embodiments, as described above, light representative of virtual images presented (e.g., displayed) on display screen 102 is directed to the user's eyes (e.g., eye 150) through lens 104 for viewing by the user. In certain embodiments, the images displayed on display screen 102 are displayed at wavelengths of light visible to the user (e.g., the images are displayed at wavelengths in the visible light wavelength range). Visible wavelength images are presented to the user such that the user can perceive the images and be presented with a virtual (e.g., mixed) reality image. For instance, images may be displayed at wavelengths between about 400 nm and about 700 nm. While images are intended to be displayed at visible light wavelengths, in many instances, display screen 102 also emits some light at other wavelengths. For example, images displayed on display screen 102 may emit some light components in the IR or near-IR range (e.g., between about 740 nm and about 950 nm). Additionally, in some embodiments, the images displayed on display screen 102 are displayed at other wavelengths of light not visible to the user (e.g., infrared wavelengths).

As shown in FIG. 1, lens 104 is positioned between display screen 102 and the user's eye 150. Lens 104 adjusts the view of the images such that the user views the images with the proper perception (e.g., at a proper distance associated with viewing virtual images). In certain embodiments, lens 104 adjust the view of the images by bending light (e.g., distorting light) in certain ways according to the properties of the lens. In various embodiments, lens 104 is a complex lens that includes multiple light adjustment components (e.g., refractors, polarizers, etc.) that combined bend the light passing through the lens in a predetermined way to present images to the user with a correct appearance. In certain embodiments, lens 104 includes at least one polarizing film 105 inside the lens. Polarizing film 105 may be a film (such as an advanced polarizing film (APF)) that polarizes at least some light to inhibit such light from passing straight through lens 104, causing such light to bounce around and have reflections within the lens. In some embodiments, polarizing film 105 causes reflections of IR or near-IR light components on display screen 102 to project towards cameras 106.

As described above, controller 110 generates images for display on display screen 102. In certain embodiments, controller 110 determines how images are displayed on display screen 102 such that when light from the display screen passes through lens 104, the images are viewed with the correct appearance by the user. For example, controller 110 may determine how images are displayed on display screen 102 based on knowledge of intrinsic properties of components in device 100 (e.g., intrinsic properties of lens 104) and extrinsic properties between components in the device (e.g., positional and orientational relationships between components such as between lens 104 and display screen 102). In some embodiments, controller 110 implements a model determined for the device that describes how light from display screen 102 propagates to user's eye 150 through lens 104 and the spaces between the display screen and the user's eye.

In certain embodiments, the model is calibrated according to measurements of intrinsic and extrinsic properties taken during initial setup (e.g., an initial stage) of device 100. For example, the model may be calibrated at the factory before device 100 is packaged and shipped from the factory. Intrinsic properties of device 100 may include properties such as, but not limited to, material and physical properties of display screen 102 and lens 104. One example of an intrinsic property of lens 104 is lens curvature. Curvature of display screen 102 may also be another intrinsic property. Extrinsic properties include properties that define relationships between components in device 100. Examples of extrinsic properties include, but are not limited to, relative positions of components, relative orientations of components. For instance, extrinsic properties may include the relative position and orientation of display screen 102 and lens 104.

Intrinsic properties may be determined from direct measurements or other calculations made for components in device 100. Extrinsic properties in device 100, however, are dependent on the actual implementation of components within the device. Thus, to measure extrinsic properties, measurements are made after assembly of device 100. For instance, positions of the components may be measured at the factory after assembly of device 100. From the measured extrinsic properties, a model (e.g., a predetermined model of light propagation) that predicts light propagation through device 100 may be determined. In certain embodiments, the model of light propagation implements the extrinsic properties of relative positions of display screen 102, lens 104, and cameras 106 in the prediction of light propagation. The model may, for example, predict how light propagates from display screen 102 and through lens 104 to user's eye 150 and/or how light propagates from display screen 102 and reflects off lens 104 to cameras 106 based, at least in part, on the relative positions of the display screen, the lens, and the cameras. Controller 110 may then implement the model of light propagation during operation determine how to display images on display screen 102 such that the images are correctly perceived by the user.

Before implementation, the model of light propagation may be initially calibrated to ensure the model correctly determines light propagation through device 100. In various embodiments, cameras 106 are implemented to calibrate the model determined based on extrinsic properties of device 100. For example, the model may be calibrated to ensure the model correctly predicts an image of reflections from display screen 102 captured by cameras 106. As described above, display screen 102 may emit some light components in the IR or near-IR wavelength. These light components may be detectable by cameras 106 when reflected off lens 104 (e.g., reflected by polarizing film 105). Alternatively, cameras that detect visible reflections may also be implemented in device 100 or display screen 102 may be adjusted to emit stronger signals in the IR or near-IR wavelengths as needed.

In certain embodiments, initial calibration for the model of light propagation includes displaying an image with a known pattern on display screen 102 and assessing images of the reflection of the image captured by cameras 106. The known pattern may include a pattern of objects and pixels with known positions and known sizes of the objects and pixels. FIG. 2 depicts an example of an image with a known pattern that can be displayed on display screen 102, according to some embodiments. Example pattern 200 includes object 200 that has a known size (e.g., the outer dimensions of the object) along with pixels 204A, 204B, 204C, 204D that have known sizes and known positions relative to each other and relative to object 202.

Turning briefly back to FIG. 1, rays 112A, 112B, 112C, 112D are ray projections that correspond to each of pixels 204A, 204B, 204C, 204D, respectively. Also shown are reflections of the ray projections onto the camera 106 positioned in the lower part of device 100. Similar reflections (not shown) may also project towards the camera 106 position in the upper part of device 100. During the calibration process, cameras 106 may capture images of the reflection. FIG. 3 depicts an example of a reflected image of the image with the known pattern of FIG. 2 captured by one or more of cameras 106, according to some embodiments. Image 300 includes captured reflections of object 302 and pixels 304A, 304B, 304C, 304D. As shown by example in FIG. 3, the positions of pixels 304A, 304B, 304C, 304D and/or object 302 may change in image 300 captured by cameras 106. It should be understood that the changes in positions and/or sizes of the captured pixels may not occur or be very small in nature compared to the changes shown in FIG. 3.

From captured image 300, assessment of the relative positions of object 302 and pixels 304A, 304B, 304C, 304D versus the known positions of object 202 and pixels 204A, 204B, 204C, 204D in pattern 200 displayed on display screen 102 may be implemented to calibrate the model of light propagation determined based on the measured extrinsic properties of device 100. For example, calculations may be made to determine the expected positions of pixels 304A, 304B, 304C, 304D based on the propagation of light modelled by the model. The calculated positions may then be compared to the actual positions in captured image 300. Any differences between positions of pixels in image 300 and positions of pixels in pattern 200 may be utilized to refine the model of light propagation until the model accurately predicts the positions and sizes of pixels 304A, 304B, 304C, 304D. With calibration for the model of light propagation refined and completed, the model may match the real operation of device 100 (e.g., the real propagation of light in the device). In some embodiments, information about differences in sizes of the pixels may also be implemented in calibration of the model of light propagation.

As discussed above, for many devices such as device 100, the device may be subjected to operating conditions that can cause changes in the extrinsic properties of the device. For example, device 100 may be subject to temperature and humidity conditions that affect materials used to mount display screen 102, lens 104, and cameras 106, which can cause shifts in the relative positions and/or orientations of these components. Additionally, device 100 may be subject to events (e.g., drop or crash incidents) that cause abrupt changes in motion and can cause shifts in the relative positions and/or orientations of display screen 102, lens 104, and/or cameras 106. Many of these changes in relative positions and/or orientations of these components can be permanent, which can cause errors in the model of light propagation that has been calibrated based on extrinsic properties of the components in device 100.

In various embodiments, the model of light propagation may be recalibrated to compensate for the changes in extrinsic properties of the components in device 100. To ensure user satisfaction, recalibration of the model of light propagation may be implemented without opening and remeasuring of the positions and orientations of the components, which would require an intrusive procedure conducted by trained personnel. In certain embodiments, a recalibration process includes the capturing of reflections of an image with a known pattern displayed on display screen 102 by cameras 106 that is similar to the initial calibration process described above. In some embodiments, the recalibration process is implemented in response to a trigger event detected on device 100. For example, the recalibration process may be implemented in response to the detection of a drop or crash of device 100. In some embodiments, the recalibration process may be implemented in response to deteriorations in the user experience (e.g., the recalibration process may be triggered when the system is restarted numerous times). Various other procedures for triggering the recalibration process may also be contemplated.

FIG. 4 illustrates a representation of device after a shift in component positions has occurred, according to some embodiments. As shown in FIG. 4, display screen 102 has shifted from its initial position 102(To) to its new position 102' and shown by arrow 400. As shown in FIG. 4, this shift changes the position and orientation between display screen 102' relative to lens 104 as compared to the initial position 102(To). Because of this shift in relative position and orientation, the model of light propagation initially calibrated for device 100 may no longer provide a proper prediction of the propagation of light through the device (e.g., from display screen 102 to user's eye 150). Without the model providing the proper prediction of light propagation, any image displayed on display screen 102 by controller 110 may be perceived incorrectly (e.g., without the proper bending or distortion) by a user and the user will have less satisfaction with the operation of device 100.

Figure 5:
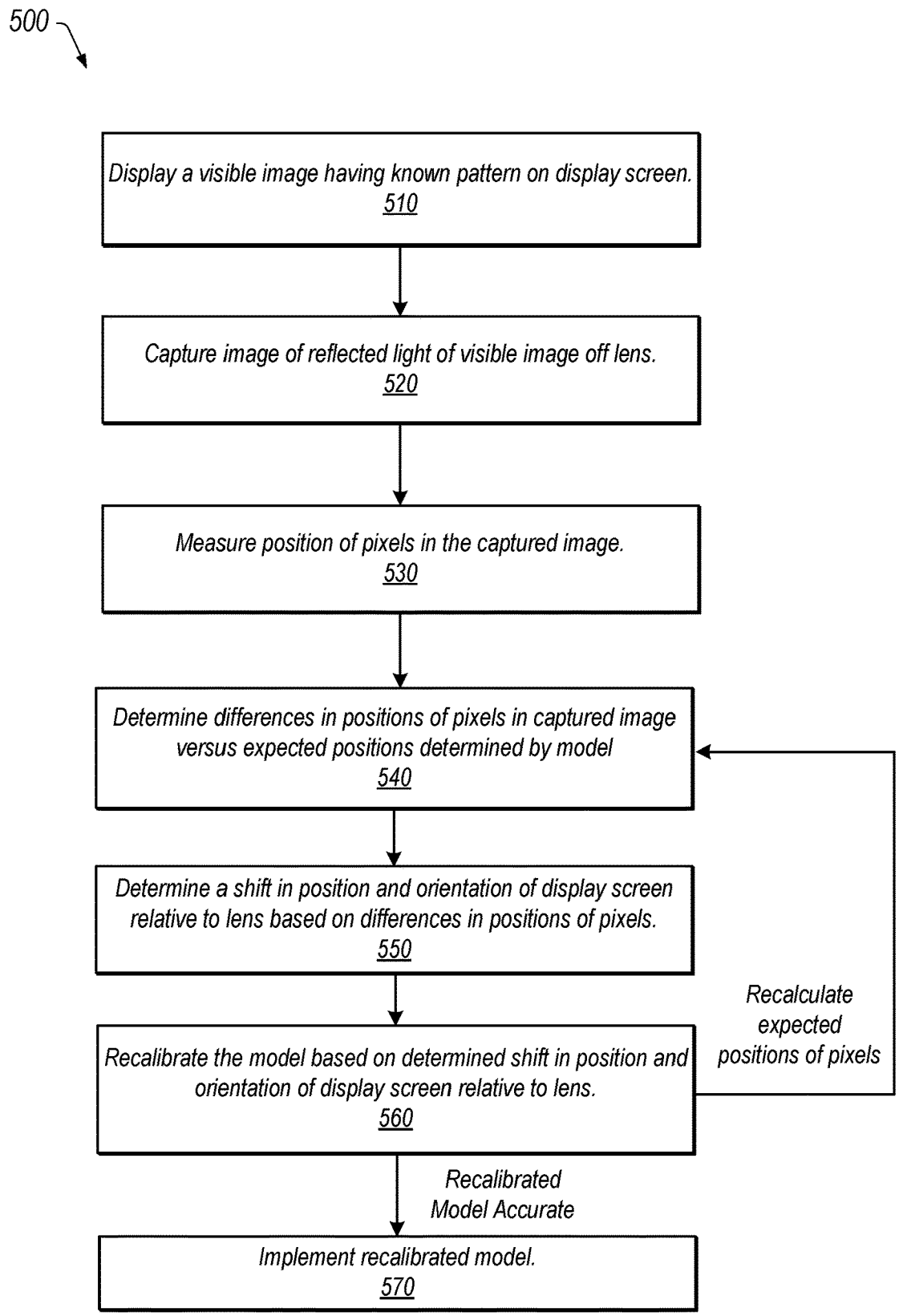
FIG. 5 is a high-level flowchart of a recalibration process for a model of light propagation implemented on a device, according to some embodiments.

In various embodiments, a recalibration process, as described above, may be implemented to "fix" the model of light propagation and ensure the model properly predicts light propagation. In some embodiments, the recalibration process may be implemented to recalibrate the model after it has been recalibrated previously (e.g., after the model was recalibrated for a previous incident). FIG. 5 is a high-level flowchart of a recalibration process for a model of light propagation implemented on device 100, according to some embodiments. Recalibration process 500 may recalibrate the model of light propagation in view of changes in relative positions of components in device 100 and allow controller 110 to implement a recalibrated model that correctly predicts light propagation in the device. With the correct light propagation, controller 110 may display images on display screen 102 in the proper manner such that the images have a correct appearance to the user (e.g., the user correctly perceives the images) after changes in the relative positions of components has occurred. In certain embodiments, recalibration process 500 is implemented in response to a trigger event, such as a drop incident of device 100.

As shown in FIG. 5, recalibration process 500 begins in 510 with displaying an image (e.g., a visible image) with a known pattern on display screen 102. The image may be generated by controller 110 according to the initially calibrated model (or current model) to display the image in a correct appearance to the user's eye 150. The pattern of the image may be any pattern of pixels and objects where the positions and sizes of the pixels and objects are known and there is at least some distance between the pixels. For instance, the image may include a pattern similar to pattern 200, shown in FIG. 2. Generally, the pattern should include at least three pixels to allow for triangulation of the positions of the pixels.

With the image displayed on display screen 102, in 520, one or more images of the reflections of the image off lens 104 are captured by cameras 106. As described above, the reflections may be IR or near-IR reflections off lens 104 (e.g., by polarizing film 105 inside lens 104). In certain embodiments, images are captured by both cameras 106 (or a total of any numbers of cameras used in device 100). With images from both cameras 106, image data from images captured by both cameras may be combined to provide a single set of image data. Combining image data from images captured by cameras at multiple angles (e.g., cameras 106 in device 100, shown in FIG. 1) may provide more information to increase accuracy in the determination of positions of pixels, as described below. While the disclosed embodiments include the use of multiple cameras 106, embodiments may be contemplated with a single camera.

Figure 6:
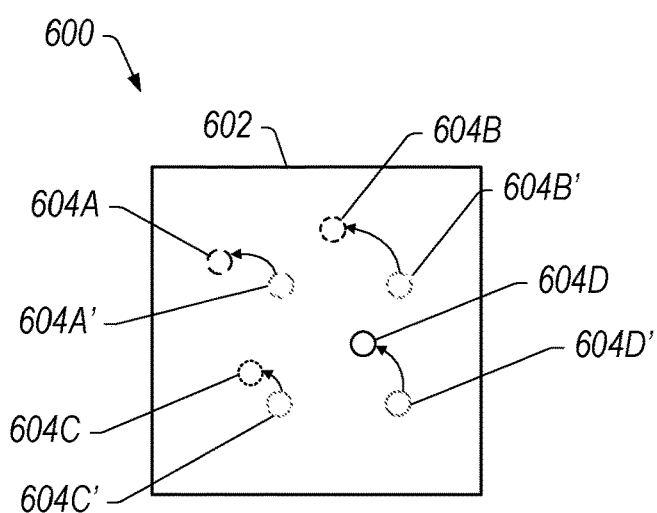
FIG. 6 depicts an example of a reflected image of an image with the known pattern captured by a camera during the recalibration process, according to some embodiments.

FIG. 6 depicts an example of a reflected image of the image with the known pattern captured by one or more of cameras 106 during the recalibration process, according to some embodiments. Image 600 includes captured reflections of object 602 and pixels 604A, 604B, 604C, 604D. As image 600 is captured subsequent to shifting in the position of display screen 102 (and the shift in relative positions of display screen 102 and lens 104), image 600 may have pixels shifted from the expected positions of the pixels determined according to the model of light propagation (e.g., the positions expected based on the implementation of the model by controller 110 in generating the image displayed on display screen 102). In the depiction of FIG. 6, pixels 604A, 604B, 604C, 604D are the actual positions of the pixels in image 600 while pixels 604A', 604B', 604C', 604D' are the expected positions based on the model predictions of light propagation. The arrows in the depiction of FIG. 6 show the shift between the expected positions and the actual positions.

Turning back to FIG. 5, in 530, the positions of the actual pixels (e.g., pixels 604A, 604B, 604C, 604D) in the captured image (e.g., image 600) may be measured. Various calculation methods may be contemplated for determining positions of the pixels in the captured image. After the positions of the pixels in the captured image are measured, in 540, differences between the actual positions of the pixels in the captured image versus the expected positions of the pixels based on the model (e.g., the differences in positions between pixels 604A, 604B, 604C, 604D and pixels 604A', 604B', 604C', 604D', as shown by the arrows in FIG. 6) may be determined. In some embodiments, the differences may be calculated as a reprojection error in the image space (e.g., in the space of captured image 600). The reprojection error may be, for example, a measure of the error in the expected positions of the pixels versus the actual positions of the pixels. In some embodiments, information about differences in sizes of the pixels may also be implemented in calculations for determining differences between actual pixels and expected pixels.

In 550, as shown in FIG. 5, a position and orientation of display screen 102 versus lens 104 may be determined based on the differences between the actual positions of the pixels in the captured image versus the expected positions of the pixels. In some embodiments, backpropagation of the error in positions of the pixels provides a determination of the error between the actual position and orientation of display screen 102 relative to lens 104 (as measured by the captured image) and the expected position and orientation of display screen 102 relative to lens 104 (e.g., the current relative position and orientation implemented in the model). This backpropagation may provide a determination (e.g., estimate) of the amount of the shift of display screen relative to lens 104 from the initial (or previous) calibration. The shift may be in a relative position and/or orientation of display lens 102 versus lens 104.

In some embodiments, forward propagation may be implemented in 550. For forward propagation, light may be propagated from cameras 106 through the device and onto display 102 (or display 102' in its new position). Any errors on display may then be measured on display 102. For example, errors between actual position and projected position may be measure in a length unit (e.g., millimeters). From the determination of errors, a determination may be made for the amount of shift of display screen 102 relative to the initial (or previous) calibration. Forward propagation may be less computationally expensive than backpropagation but may not be as accurate due to a higher degree of freedom in the error.

In 560, the shift in relative position and orientation determined may be used to recalibrate the model of light propagation. For example, recalibrating the model may include modifying the relative position and orientation of display screen 102 and lens 104 implemented in the model according to the shift in relative position and orientation of display screen 102 and lens 104 determined in 550. After the model is recalibrated with the determined shift, the recalibrated model may be operated to recalculate the expected positions of pixels in the captured image and determine any differences in the actual positions of the pixels and the newly calculated expected positions of the pixels. If the differences are the same (or satisfy an accuracy threshold), the recalibrated model may be implemented in 570. If the differences are not the same (or do not satisfy the accuracy threshold), the shift in relative positions may be redetermined in 550 and the model again recalibrated in 560.

In certain embodiments, implementation of the recalibrated model includes replacing the initial (or previously) calibrated model implemented by controller 110 with the recalibrated model. Controller 110 may then implement the recalibrated model in subsequent displaying of images on display screen 102. With the recalibrated model implemented by controller 110, the controller may now display images on display screen 102 that are perceived correctly by the user's eye 150 through lens 104, as described herein. Thus, recalibration process 500 is a process that may be implemented on device 100 to recalibrate the display of images when changes in physical positions or orientations of components in device 100 occur due to gradual changes due to, for example, material degradation or abrupt changes in properties due to physical incidents such as drops of the device. Additionally, recalibration process 500 is a process that may be implemented on device 100 without the need for any additional sensors added to the device since cameras 106 (e.g., eye tracking cameras) are typically already included on the device.

While the embodiments disclosed discuss the change in relative position and orientation between display screen 102 and lens 104, it should be understood that the recalibration process may be implemented to recalibrate the model of light propagation for any changes in relative position and orientation between any components along a path of light within device 100. For instance, the recalibration process may be implemented to recalibrate the model for changes in position and orientation of cameras 106 relative to lens 104. In some contemplated embodiments, reliability studies may be implemented to determine which components have higher probabilities of shifting during use of device 100. Recalibration processes may then be focused on the components with higher probability of shifting first while components with low probabilities of shifting may not need to be recalibrated.

Example HMD Device

Figure 7:
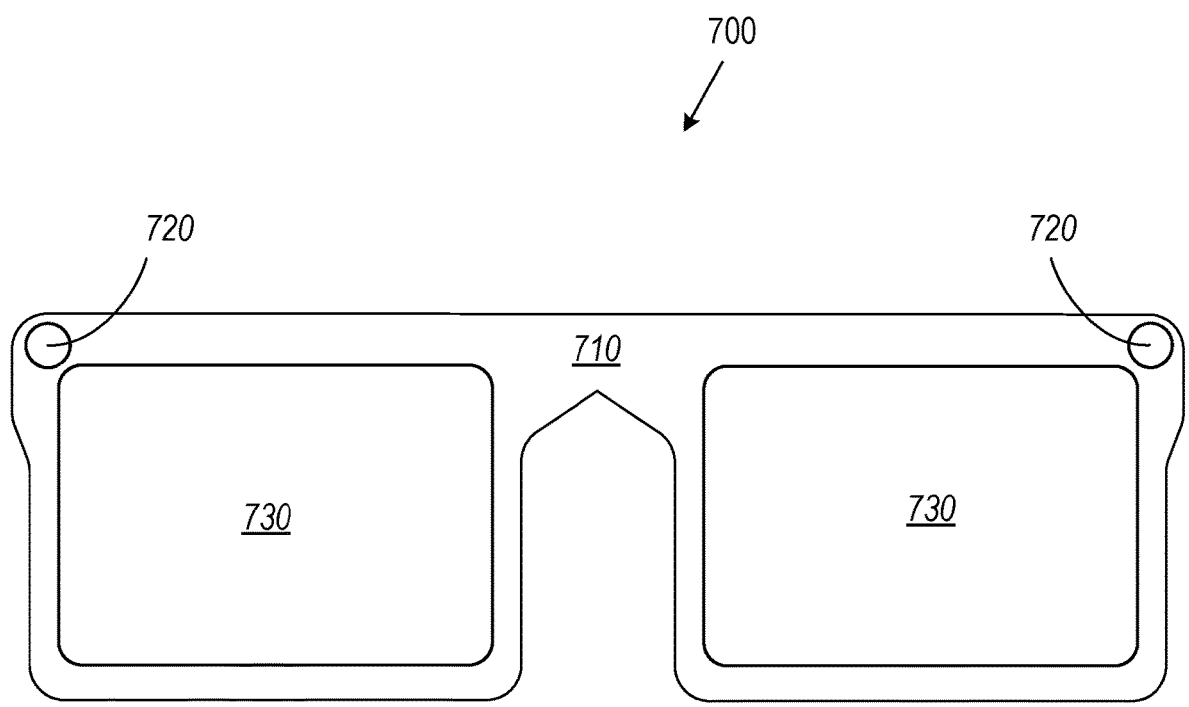
FIG. 7 illustrates an exemplary HMD device, according to some embodiments.

FIG. 7 illustrates an exemplary HMD device 700, according to some embodiments. Embodiments of HMD 700 may, for example, be used in augmented or mixed (AR) applications to provide augmented or mixed reality views to the wearer. HMD 700 may include frame 710 with one or more sensors 720 and lenses 730. Frame 710 may be, for example, an eyeglass frame, a goggle frame, or other frame wearable on a head of a user. Sensors 720 may be integrated in or attached to frame 710. Sensors 720 may collect information about the wearer's environment (video, depth information, lighting information, etc.) and about the wearer (e.g., eye or gaze tracking sensors). Sensors 720 may include one or more of, but are not limited to one or more eye tracking cameras (e.g., infrared (IR) cameras) that capture views of the user's eyes, one or more world-facing cameras (e.g., RGB video cameras) that can capture images or video of the real-world environment in a field of view in front of the user, and one or more ambient light sensors that capture lighting information for the environment. HMD device 700 may also include one or more light sources such as LED point light sources that emit light (e.g., light in the IR portion of the spectrum) towards the user's eye or eyes.

Lens(es) 730 may be mounted in frame 710. HMD device 700 may be worn on a user's head (the "wearer") so that the lenses 730 are disposed in front of the wearer's eyes. In some embodiments, HMD device 700 may implement any of various types of display technologies or display systems on lenses 730. For example, HMD device 700 may include a display system that directs light that forms images (virtual content) through one or more layers of waveguides in the lens(es) 730; output couplers of the waveguides (e.g., relief gratings or volume holography) may output the light towards the wearer to form images at or near the wearer's eyes. As another example, HMD device 700 may include a direct retinal projector system that directs light towards reflective components of the lens(es); the reflective lens(es) is configured to redirect the light to form images at the wearer's eyes.

In various embodiments, sensors 720 may provide the collected information to controller 150 of the XR system, as described above. In certain embodiments, sensors 720 include one or more visible light cameras (e.g., RGB video cameras such as cameras 120, described herein) that capture video of the wearer's environment and that, in some embodiments, may be used to provide the wearer with a virtual view of their real environment. In some embodiments, video streams of the real environment captured by sensors 720 are processed by the controller (e.g., controller 150) of HMD device 700 to render augmented or mixed reality frames that include virtual content overlaid on the view of the real environment, and the rendered frames may be provided to displays integrated in lenses 730. In some embodiments, input from an eye tracking camera (not shown) may be used in a gaze tracking process executed by the controller to track the gaze/pose of the user's eyes for use in rendering the augmented or mixed reality content for display on lenses 730.

Example Computer System

Figure 8:
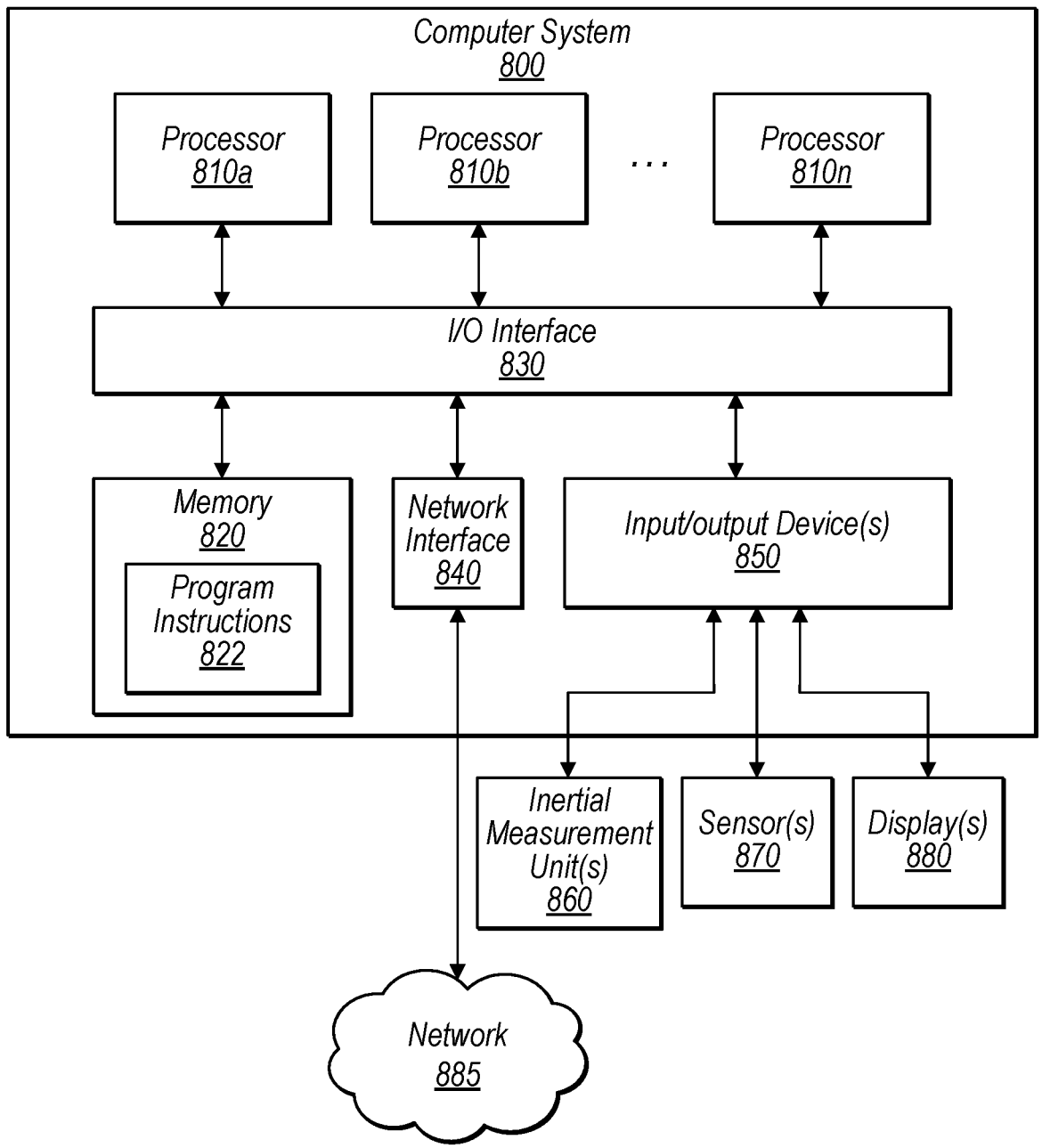
FIG. 8 illustrates exemplary computer system 800 that may implement an extended reality device and recalibration process.

FIG. 8 illustrates exemplary computer system 800 that may implement an extended reality device and recalibration process as described above. In different embodiments, computer system 800 may be any of various types of devices, including, but not limited to, a personal computer system, desktop computer, laptop, notebook, tablet, slate, pad, or netbook computer, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of program instructions for displaying images, calibrating models, and recalibrating models, as described herein, may be executed in one or more computer systems 800, which may interact with various other devices. Note that any component, action, or functionality described above with respect to FIGS. 1-6 may be implemented on one or more computers configured as computer system 800 of FIG. 8, according to various embodiments. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some cases, it is contemplated that embodiments may be implemented using a single instance of computer system 800, while in other embodiments multiple such computer systems, or multiple nodes making up computer system 800, may be configured to host different portions or instances program instructions for re-mapping, rendering, encoding, or decoding points cloud as described above for various embodiments. For example, in one embodiment some elements of the program instructions may be implemented via one or more nodes of computer system 800 that are distinct from those nodes implementing other elements.

In some embodiments, computer system 800 may be implemented as a system on a chip (SoC). For example, in some embodiments, processors 810, memory 820, I/O interface 830 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 820 may be configured to store compression or decompression program instructions 822 and/or sensor data accessible by processor 810. In various embodiments, system memory 820 may be implemented using any suitable memory technology, such as static random-access memory (SRAM), synchronous dynamic RAM (SDRAM), nonvolatile/Flash-type memory, or any other type of memory. In the illustrated embodiment, program instructions 822 may be configured to implement any of the functionality described above. In some embodiments, program instructions and/or data may be received, sent or stored upon different types of computer-accessible media or on similar media separate from system memory 820 or computer system 800.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network 885 (e.g., carrier or agent devices) or between nodes of computer system 800. Network 885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 822, which may be processor-executable to implement any element or action described above. In one embodiment, the program instructions may implement the methods described above. In other embodiments, different elements and data may be included.

Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Extended Reality

A real environment refers to an environment that a person can perceive (e.g. see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

There are many types of devices that allow a user to experience the various forms of XR. Examples include HMDs, heads up displays (HUDs), projector-based systems, smart windows, tablets, desktop or laptop computers, smart watches, earbuds/headphones, controllers that may include haptic devices, and many others. As mentioned above, an HMD, or any of the other devices listed above may include opaque displays (e.g. liquid crystal displays (LCDs), organic light emitting diode (OLED) displays or micro-LED displays) or see through displays. A see through display can have a medium through which light is directed to a user's eyes. The medium can include one or more of a waveguide, hologram medium, optical combiner, optical reflector and other optical components. An image can be generated and propagated through the medium using a display source such as OLEDs, micro-LEDs, liquid crystal on silicon (LCOS), a light scanner, digital light projection (DLP).

Devices for XR may also include audio output devices such as speakers to present audio (including spatial audio) to users, haptics devices to stimulate the user's sense of touch, and other devices to stimulate any of the user's senses. Additionally, the device may include numerous sensors, including cameras, microphones, depth sensors, eye tracking sensors, environmental sensors, input sensors, and other sensors to allow the device to understand the user and the real environment.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
    a display screen positioned in a field of view of an eye, wherein the display screen is configured to display an image;
    a lens positioned between the eye and the display screen, wherein the lens is configured to render the image presented on the display screen in correct appearance to the eye;
    one or more cameras configured to capture images of the eye, wherein the lens is positioned between the eye and the one or more cameras; and
    a controller comprising one or more processors configured to:
        generate, for display on the display screen, the image having a known pattern of pixels;
        capture, by the one or more cameras, one or more images of at least some reflections of light from the image off the lens;
        measure positions of the pixels in the captured images in an image space;
        determine differences between the positions of the pixels in the captured images and positions of the pixels expected according to a predetermined model of the display screen, the lens, and the one or more cameras;
        determine a shift in position and orientation of the display screen relative to the lens based on the determined differences between the positions; and
        recalibrate the predetermined model based on the determined shift in position and orientation of the display screen relative to the lens.

2. The apparatus of claim 1, wherein the one or more cameras are configured to capture infrared wavelength images, and wherein the image is displayed at a visible wavelength with the image having at least some infrared wavelength component, the captured images being reflections of the infrared wavelength component of the light from the image.

3. The apparatus of claim 1, wherein the lens is configured to bend light passing through the lens to render the image presented on the display screen in the correct appearance to the eye.

4. The apparatus of claim 1, wherein the lens includes a polarizing film, and wherein the polarizing film causes at least some reflections of the light from the image.

5. The apparatus of claim 1, wherein the controller is further configured to:
    determine a shift in position and orientation of the display screen relative to the one or more cameras based on the determined differences between the positions of the pixels.

6. The apparatus of claim 1, wherein the known pattern includes a pattern with at least 3 pixels separated by at least some distance.

7. The apparatus of claim 1, wherein the controller is configured to generate the image having the known pattern of pixels and determine the shift in position and orientation of the display screen relative to the lens in response to a trigger event on the apparatus.

8. The apparatus of claim 1, wherein the predetermined model is configured to model propagation of light from the display screen through the lens and to the eye based on relative positions of the display screen and the lens.

9. The apparatus of claim 1, wherein the controller is configured to recalibrate the predetermined model by revising the relative position of the display screen and the lens implemented in the predetermined model based on the shift in position and orientation of the display screen relative to the lens determined from the captured images.

10. The apparatus of claim 1, wherein the controller is configured to:
    implement the recalibrated predetermined model for displaying additional images on the display screen.

11. The apparatus of claim 1, wherein the predetermined model of the display screen, the lens, and the one or more cameras has been determined during an initial setup of the display screen, the lens, and the one or more cameras.

12. The apparatus of claim 1, wherein the predetermined model implements measurements of intrinsic and extrinsic properties of the display screen, the lens, and the one or more cameras, at least one of the extrinsic properties being a relative position and orientation between the display screen and the lens.

13. A method, comprising:
    displaying, on a display screen, an image having a known pattern of pixels, wherein the display screen is positioned in a field of view of an eye, and wherein a lens positioned between the eye and the display screen renders the image presented on the display screen in correct appearance to the eye;
    capturing, by one or more cameras, one or more images of at least some reflections of light from the image off the lens, wherein the lens is positioned between the one or more cameras and the eye;

measuring positions of the pixels in the captured images in an image space;

determining differences between the positions of the pixels in the captured images and positions of the pixels expected according to a predetermined model of the display screen, the lens, and the one or more cameras;

determining a shift in position and orientation of the display screen relative to the lens based on the determined differences between the positions; and recalibrating the predetermined model based on the determined shift in position and orientation of the display screen relative to the lens.

14. The method of claim 13, further comprising implementing the recalibrated predetermined model in displaying additional images on the display screen.

15. The method of claim 13, wherein the captured images are reflections of an infrared wavelength component of light from the image.

16. The method of claim 13, wherein the predetermined model implements measurements of intrinsic and extrinsic properties of the display screen, the lens, and the one or more cameras during an initial setup of the display screen, the lens, and the one or more cameras, at least one of the extrinsic properties being a relative position and orientation between the display screen and the lens.

17. The method of claim 16, wherein the positions of the pixels expected according to the predetermined model are determined by modelling the propagation of light from the display screen through the lens and to the eye based on the intrinsic and the extrinsic properties.

18. An apparatus, comprising:
a display screen positioned in a field of view of an eye, wherein the display screen is configured to display an image;

a lens positioned between the eye and the display screen, wherein the lens is configured to render the image presented on the display screen in correct appearance to the eye;

two cameras configured to capture images of the eye from two different angles, wherein the lens is positioned between the eye and the two cameras; and a controller comprising one or more processors configured to:
generate, for display on the display screen, the image having a known pattern of pixels;

capture, by the two cameras, one or more images of at least some reflections of light from the image off the lens;

measure positions of the pixels in the captured images in an image space;

determine differences between the positions of the pixels in the captured images and positions of the pixels expected according to a predetermined model of the display screen, the lens, and the one or more cameras;

determine a shift in position and orientation of the display screen relative to the lens based on the determined differences between the positions; and recalibrate the predetermined model based on the determined shift in position and orientation of the display screen relative to the lens.

19. The apparatus of claim 18, wherein the two cameras are configured to capture infrared wavelength images.

20. The apparatus of claim 18, wherein the controller is configured to measure the positions of the pixels in the captured images in the image space based on a combination of image data captured by the two cameras.

* * * * *